United States Patent [19]

Rulseh

[11] 3,992,960

[45] Nov. 23, 1976

[54] TWO SPEED MANUAL PRESET TIMER

[75] Inventor: Roger D. Rulseh, New Holstein, Wis.

[73] Assignee: Deltrol Corporation, Belwood, Ill.

[22] Filed: Feb. 3, 1975

[21] Appl. No.: 546,409

[52] U.S. Cl. .................................... 74/393; 74/435; 317/141 R

[51] Int. Cl.$^2$ .................... F16H 35/02; F16H 55/04; H01H 47/18

[58] Field of Search .............. 74/393, 435, 437, 3.5, 74/32, 393; 317/141 R; 99/327, 332, 335; 58/21.13; 200/38 DA

[56] References Cited

UNITED STATES PATENTS

| | | | |
|---|---|---|---|
| 1,902,508 | 3/1933 | Kearsley | 317/141 R |
| 2,261,723 | 11/1941 | Hoffman | 74/393 X |
| 3,098,399 | 7/1963 | Berthiaume | 74/437 X |

*Primary Examiner*—Leonard H. Gerin
*Attorney, Agent, or Firm*—John L. Harris

[57] ABSTRACT

A two speed manual preset timer in which the cam shaft is driven by a pair of constantly meshing gears having two mating segments of different but constant pitch radii. One pair of segments gives relatively high shaft speed in a sector of the timing range adjacent the OFF position for accuracy in short timings. The other pair of segments gives relatively slow shaft speed in a sector at the other end of the timing range for long timings. The segments of the gears are joined by transition segments of varying pitch radii, providing a sector of varying shaft speed between the short timing and long timing sectors.

3 Claims, 4 Drawing Figures

TWO SPEED MANUAL PRESET TIMER

BACKGROUND OF THE INVENTION

This invention relates in general to timing devices and more particularly to the manual preset type.

In cooking appliances such as micro-wave ovens wide variations in cooking time are required depending on the nature of the material being cooked. Some items require only a few minutes. Other items may need up to 30 minutes, requiring the timer to have a 30 minute range. A timer having even scale divisions is not desirable in an application of this type as the manual setting error is too large for short time settings.

One solution for obtaining accurate short timings in a timer having a long timing range is the two speed timer. In this type of timer, the cam shaft is driven at relatively high speed through the first part of its timing range to give short accurate timings. It is driven at low speed through the remainder of its timing range to provide the long timings. Prior to the present invention, this type of timer required a double gear train, one for high speed and one for low speed. It also required a gear shifting mechanism to change speeds at the proper point on the timer dial. This extra mechanism adds to the cost of the timer and also decreases the reliability as it adds to the sources of possible failure.

Another type of timer proposed for this application is the so-called "log" or non-linear scale timer. In this type of timer the cam shaft is driven by a pair of log or eccentric gears of constantly varying pitch radius. This arrangement provides a constantly varying cam shaft speed. This speed increases progressively as the timer runs from its maximum setting back to its OFF position. This gives relatively large dial divisions for the short timings which improves the setting accuracy. It also provides for the longer timings. This type of timer has the disadvantage of being confusing to the user due to the constantly varying scale divisions on the dial.

BRIEF SUMMARY OF THE INVENTION

The primary object of the invention is to provide a manual preset timer having the advantages and characteristics of a two speed timer but which eliminates the usual double gear train and gear shifting mechanism.

A further object of the invention is the provision of a manual preset timer having a high constant speed timing range for short accurate timings, a low constant speed timing range for longer timings and an intermediate variable speed timing range connecting the two constant speed timing ranges.

These objects are achieved by the provision of a pair of special constantly meshing gears, one driven by the timer motor and serving to drive the other gear which in turn drives the timer mechanism. Each of the gears includes a segment of relatively small pitch radius and a segment of relatively large pitch radius connected by a transition segment which increases in pitch radius leading from one segment to the other. Assuming the timer is set at its maximum timing, these gears function to drive the timing mechanism at constant low speed to give a long timing. The gears then drive the mechanism at increasing speed through the transition range to the high speed timing range. The timing mechanism is then driven at relatively high constant speed through the high speed timing range to the OFF position.

This arrangement requiring only two gears gives a short timing range on a relatively large linear scale making the timer easy to set for short accurate timings. It also provides a long timing range on a linear scale for ease in setting. The intermediate dial range requires a non linear scale. However this is but a small portion of the dial range which is seldom used.

Other objects of the invention will appear from the following detailed description and appended claims.

DETAILED DESCRIPTION OF INVENTION

Figures 1, 2, 3, 4:
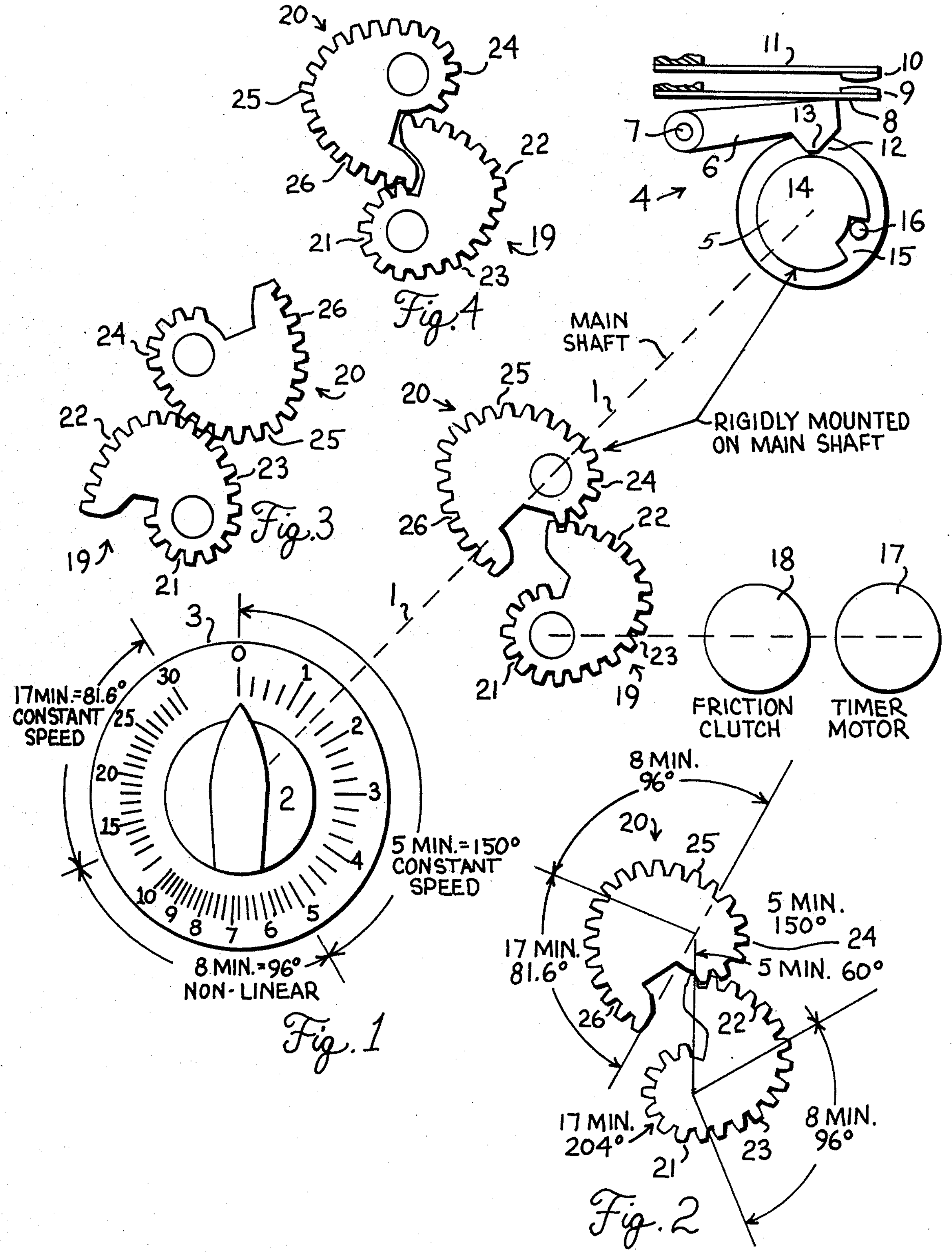
FIG. 1 is a schematic representation of a manual preset timer embodying the invention.
FIG. 2 is a pitch radius chart of a preferred form of the drive gears.
FIG. 3 is a fragmentary view showing the drive gears when the timer shaft is at an intermediate position between the low speed and the high speed timing ranges.
FIG. 4 shows the drive gears when the timer shaft is at its maximum setting.

Referring to FIG. 1, reference character 1 indicates schematically the main or final shaft of a manual preset timer. This shaft at its front end is rigidly attached to a manual presetting knob 2 located in front of a dial 3. This main shaft actuates a control device generally indicated as 4. This control device preferably includes a rotatable lost motion cam 5 which may be loosely mounted on shaft 1. This cam 5 actuates a cam follower 6 which is pivoted at 7 and actuates a switch blade 8 carrying movable contact 9 cooperating with a stationary contact 10 carried by a second switch blade 11. Cam 5 is formed with a notch 12 which receives the end 13 of the follower 6 when the timer is in the timed out or OFF position as shown. Cam 5 is actuated by rotation of shaft 1 by a lost motion drive including a cam driver 14 having a notch 15 receiving a pin 16 carried by the cam. Cam driver 14 is rigidly attached to shaft 1.

The main shaft 1 thus serves as an operating means for the control device 4. Turning of this shaft clockwise by the knob from the OFF or timed out position shown in FIG. 1 into the timing range shown on the dial rotates cam 5, lifting the follower 6 thus moving the switch from open position to closed position. This switch is returned to open position by counter-clockwise rotation of shaft 1. When this shaft is returned back to the timed out position, follower 13 rides down the cam notch 12 and the cam advances rapidly due to the lost motion drive, allowing the contacts to open with snap action.

The shaft or operating means 1 is driven in a counterclockwise direction by a drive means including a constant speed motor 17, a friction clutch 18, a drive gear 19 and a driven gear 20 which is rigidly attached to the shaft.

The drive gear 19 and driven gear 20 are constantly in mesh and drive the shaft 1 in timing direction at a relatively high constant speed through the portion of the timing range adjacent the OFF or timed out position. As shown in FIG. 1, the first five minutes of the timing range occupies 150° of the dial, giving a dial space of 30° for each minute. This makes it easy for the user to set short accurate timings. Also, gears 19 and 20 drive the shaft at relatively low constant speed through the portion of the timing range remote from the OFF position. As shown in FIG. 1, the last seventeen minutes of the thirty minute timing range occupy only 81.6° on the dial scale, giving a dial space of only 4.8° per minute. The space between the two constant speed dial ranges is non linear and serves to connect the high speed timing range with the low speed timing range. This arrangement gives the user accuracy for short timings where accuracy is needed and also provides for longer timings where accuracy is unnecessary.

This dual constant range timing action is provided by the special configuration of the gears in accordance with the invention. The drive gear 19 is formed with a segment of small constant pitch radius 21, a segment of relatively large constant pitch radius 22, and a transition segment 23 of increasing pitch radius extending from constant speed segment 21 to constant speed segment 22. Segment 22 meshes with a relatively small constant pitch radius segment 24 on gear 20. Transition segment 23 meshes with a mating transition segment 25 on gear 20, and segment 21 meshes with a relatively large constant pitch radius segment 26 on gear 20. The gear formation is more clearly shown in FIG. 2 in which the gear teeth have been omitted to show the pitch lines and angles producing the dial layout shown in FIG. 1.

When the knob 2 is turned manually to the maximum or 30 minute setting, the gear 20 drives gear 19 counter-clockwise, this being allowed by friction clutch 18. During the final portion of this setting stroke, the large sector 26 of gear 20 is driving the small sector 21 of gear 19 and gear 19 is thus driven considerably faster than gear 20 rotates. At the maximum setting, gear 19 catches up with gear 20 as shown in FIG. 4. This engagement of the gear edges serves as a stop for preventing manual rotation of the knob beyond the maximum setting.

At the beginning of this maximum setting stroke, the cam follower end 13 is cammed out of the cam notch 14 and moves the switch from open position to closed position. This starts the timer motor as well understood in the art. This motor rotates the drive gear 19 clockwise at a constant speed herein illustrated as one revolution in 30 minutes. At the beginning of this timing period, small sector 21 of gear 19 is driving large sector 26 of gear 20. Hence gear 20 and timing shaft 1 are driven couterclockwise at low speed through the seventeen minute constant speed portion of the dial range. At this time, transition sectors 23 and 25 engage as shown in FIG. 3 and the cam shaft 1 is driven at increasing speed through the non linear portion of the dial range. Finally, the high constant speed sectors 22 and 24 mesh and the timer shaft 1 is driven at constant speed through the five minute high speed timing range to the OFF position where the switch is returned from closed position to open position as shown in FIG. 1.

From the foregoing it will be apparent that the invention provides a two speed timer giving accurate short timings and also long timings. It will be further apparent that the invention eliminates the usual dual gear train and gear shift mechanism and still provides a timer having uniform dial increments in the short and long timing ranges. While a prefered timing range and gear proportions have been described, this is for illustrative purposes only. Changes may be made without departing from the spirit and scope of the invention as defined in the appended claims.

I claim:

1. In a two speed timer, the combination of, a control device, said control device having a first position and a second position, means for moving said control device from its first position to its second position, timing means for returning the control device from its second position to its first position, said timing means including operating means for the control device, said operating means having a timed out position at which it returns the control device and being movable from said timed out position through a timing range, means for driving said operating means through said timing range toward said timed out position, said drive means including a constant speed timing motor, a drive gear driven by the timing motor, a driven gear constantly meshing with the drive gear and driven thereby, said driven gear being arranged to actuate said operating means, each of said gears having a segment of relatively small uniform pitch radius, a segment of relatively large uniform pitch radius and a transition segment of increasing pitch radius connecting the relatively small pitch radius segment with the relatively large pitch radius segment, said gears being arranged to drive the operating means at a relatively high constant speed through a portion of the timing range adjacent the timed out position, at a relatively low constant speed through a portion of the timing range remote from the timed out position, and at an increasing speed through an intermediate portion of the timing range.

2. The combination recited in claim 1 in which the operating means is rotatable and in which the driven gear is rigidly attached thereto so that the operating means and driven gear remain in a fixed angular relationship.

3. The combination recited in claim 2 including a manual operator for rotating the operating means from its timed out position to various positions in the timing range.

* * * * *